(12) United States Patent
He et al.

(10) Patent No.: US 10,990,226 B2
(45) Date of Patent: Apr. 27, 2021

(54) INPUTTING INFORMATION USING A VIRTUAL CANVAS

(71) Applicant: INTERNATIONAL BUSINESS MACHINES CORPORATION, Armonk, NY (US)

(72) Inventors: Shiwen He, Shanghai (CN); Rui Shen, Shanghai (CN); Wen Bao Yin, Shanghai (CN); Dan Dan Wang, Shanghai (CN); Jun Liao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 15/915,163

(22) Filed: Mar. 8, 2018

(65) Prior Publication Data
US 2019/0278426 A1  Sep. 12, 2019

(51) Int. Cl.
*G06F 3/042* (2006.01)
*G06F 3/0488* (2013.01)

(52) U.S. Cl.
CPC ........ *G06F 3/0425* (2013.01); *G06F 3/04883* (2013.01)

(58) Field of Classification Search
CPC ............................ G06F 3/0425; G06F 3/04883
See application file for complete search history.

(56) References Cited

U.S. PATENT DOCUMENTS

| 8,341,558 | B2 | 12/2012 | Li |
| 8,619,100 | B2 | 12/2013 | Capela et al. |
| 8,769,442 | B2 | 7/2014 | Khosravy et al. |
| 2009/0115721 | A1* | 5/2009 | Aull ........................ G06F 3/017 345/156 |

(Continued)

FOREIGN PATENT DOCUMENTS

| WO | 2015130867 A2 | 9/2015 |
| WO | 2017005023 A1 | 1/2017 |

OTHER PUBLICATIONS

Bested et al., "A social interactive whiteboard system using finger-tracking for mobile devices", Multimed Tools Appl. (2017) vol. 76, pp. 5367-5397.

(Continued)

*Primary Examiner* — Wing H Chow
(74) *Attorney, Agent, or Firm* — Michael A. Petrocelli (57) ABSTRACT

A method includes receiving, by a device, a request to input information through a virtual canvas, the device includes a projector and a camera, the virtual canvas providing an input space to a user of the device, the virtual canvas includes a region of a blank surface illuminated by the projector, based on the received request, enabling the projector and the camera, detecting a distance between the device and the virtual canvas, based on the detected distance, adjusting the projector and the camera to focus on the virtual canvas, capturing a movement made by an object on the virtual canvas, the movement is associated with the information being input, converting the movement into a plurality of (Continued)

frames, each frame is associated with the movement, processing the plurality of frames to obtain the input information, and projecting the input information on the virtual canvas.

20 Claims, 4 Drawing Sheets

(56) References Cited

U.S. PATENT DOCUMENTS

| | | | |
|---|---|---|---|
| 2011/0151926 A1* | 6/2011 | Kim | G06F 3/017 455/556.1 |
| 2011/0280441 A1* | 11/2011 | Chen | G06F 3/017 382/103 |
| 2015/0248167 A1 | 9/2015 | Turbell et al. | |
| 2017/0003746 A1 | 1/2017 | Anglin et al. | |
| 2017/0192737 A1 | 7/2017 | Mabey et al. | |
| 2017/0249748 A1 | 8/2017 | Khosravy et al. | |

OTHER PUBLICATIONS

Chen et al., "Extending a Mobile Device's Interaction Space through Body-Centric Interaction", MobileHCI'12, Sep. 21-24, 2012, San Francisco, CA, USA, Copyright 2012 ACM, 10 pages.
O'Donoghue, "HTML5 for the Mobile Web: Canvas", mobiForge, Feb. 12, 2014, 17 pages.

* cited by examiner

INPUTTING INFORMATION USING A VIRTUAL CANVAS

BACKGROUND

The present invention generally relates to the field of computer systems, and more specifically, to inputting technology.

SUMMARY

According to an embodiment of the present invention, a method may include receiving, by a device, a request to input information through a virtual canvas, the device includes a projector and a camera, the virtual canvas providing an input space to a user of the device, the virtual canvas including a region of a blank surface illuminated by the projector, based on the received request, enabling the projector and the camera of the device, detecting a distance between the device and the virtual canvas, based on the detected distance, adjusting the projector and the camera to focus on the virtual canvas, capturing, using the camera, a movement made by an object on the virtual canvas, the object is operated by a user of the device, the movement is associated with the information being input, converting the movement into a plurality of frames, wherein each frame in the plurality of frames is associated with the movement, processing the plurality of frames to obtain the input information, the input information includes points, lines, text or drawings, and projecting the input information on the virtual canvas, the user is capable of expanding the input space through the virtual canvas.

According to another embodiment of the present invention, a computing system may include a computer processor coupled to a computer-readable memory unit, said memory unit comprising instructions that when executed by the computer processor implements a method including receiving, by a device, a request to input information through a virtual canvas, the device includes a projector and a camera, the virtual canvas providing an input space to a user of the device, the virtual canvas including a region of a blank surface illuminated by the projector, based on the received request, enabling the projector and the camera of the device, detecting a distance between the device and the virtual canvas, based on the detected distance, adjusting the projector and the camera to focus on the virtual canvas, capturing, using the camera, a movement made by an object on the virtual canvas, the object is operated by a user of the device, the movement is associated with the information being input, converting the movement into a plurality of frames, wherein each frame in the plurality of frames is associated with the movement, processing the plurality of frames to obtain the input information, the input information includes points, lines, text or drawings, and projecting the input information on the virtual canvas, the user is capable of expanding the input space through the virtual canvas.

According to another embodiment of the present invention, a computer program product may include a computer readable non-transitory article of manufacture tangibly embodying computer readable instructions which, when executed, cause a computer to carry out a method including receiving, by a device, a request to input information through a virtual canvas, the device includes a projector and a camera, the virtual canvas providing an input space to a user of the device, the virtual canvas including a region of a blank surface illuminated by the projector, based on the received request, enabling the projector and the camera of the device, detecting a distance between the device and the virtual canvas, based on the detected distance, adjusting the projector and the camera to focus on the virtual canvas, capturing, using the camera, a movement made by an object on the virtual canvas, the object is operated by a user of the device, the movement is associated with the information being input, converting the movement into a plurality of frames, wherein each frame in the plurality of frames is associated with the movement, processing the plurality of frames to obtain the input information, the input information includes points, lines, text or drawings, and projecting the input information on the virtual canvas, the user is capable of expanding the input space through the virtual canvas.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Nowadays, most electronic devices (including mobile phones, tablets etc.) include a display screen. Despite their advanced processing capabilities, some electronic devices have very small display screens which may hinder providing information as input to the device. This may be particularly true for people with limited vision. Additionally, it may be difficult for a user to input certain information such as a large area drawing or view using a small display screen.

Embodiments of the present invention relate to the field of computer systems, and more particularly to inputting technology. The following described exemplary embodiments provide a system, method, and computer program product to, among other things, provide information as an input to a mobile device using a virtual canvas. Therefore, the present embodiment has the capacity to improve the technical field of inputting technology by providing an expanded and scalable input area through the utilization of a camera and a projector typically coupled to mobile devices, the expanded input area makes inputting information to mobile devices easier when compare to typical input with physical/virtual keyboard on screen. As such, the virtual canvas provides an additional input space to the user, thereby increasing the capabilities of mobile devices.

Therefore, embodiments of the present invention may facilitate inputting of information to mobile devices with small display screens. One way to input information to mobile devices with small display screens is to use a virtual canvas as the input mechanism rather than using the small display screen. One embodiment by which information may be input using the virtual canvas is described in detailed below by referring to the accompanying drawings in FIGS. 1-9.

Figure 1:
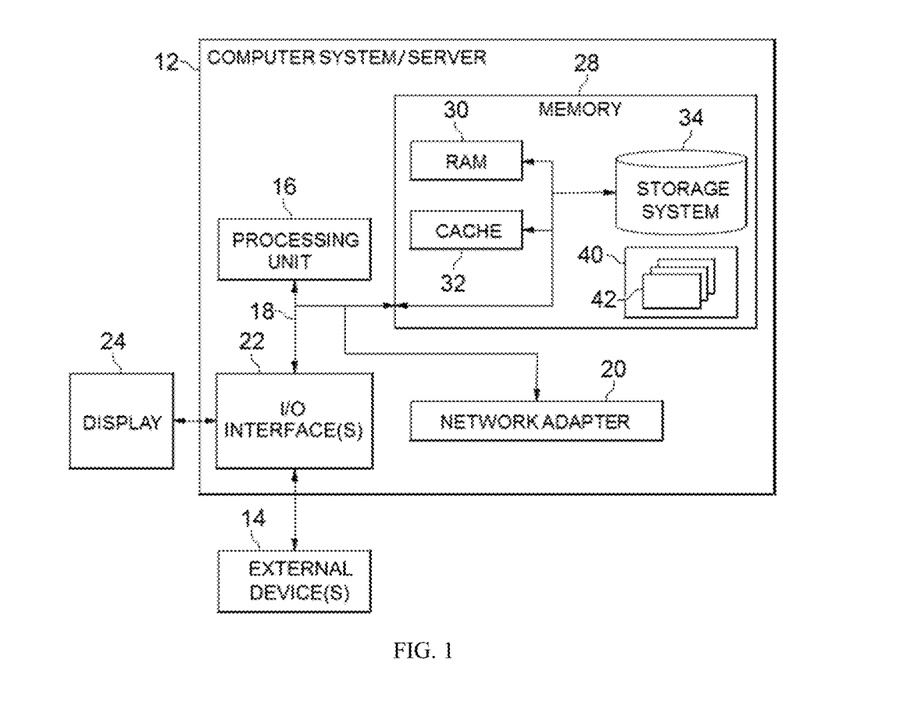
FIG. 1 shows an exemplary computer system which is applicable to implement embodiments of the present invention.

Referring now to FIG. 1, an exemplary computer system/server 12 which is applicable to implement embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
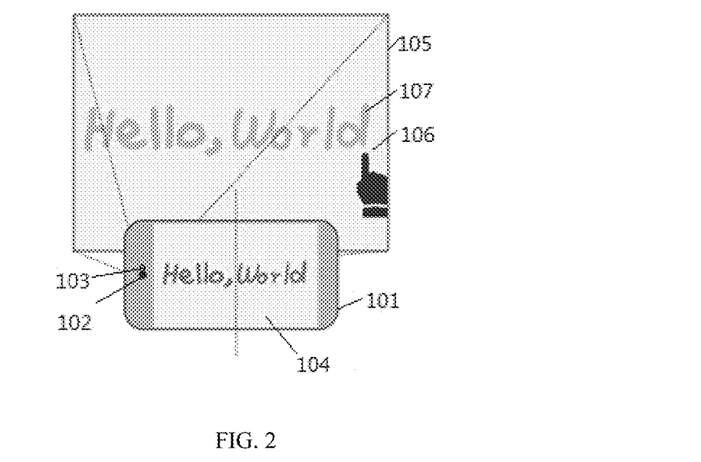
FIG. 2 shows an external view of a device during input of information using a two-dimensional virtual canvas, according to an embodiment of the present invention.

Referring now to FIG. 2, an external view of a device 101 and a virtual canvas 105 is shown, according to an embodiment of the present invention. In this embodiment, the device 101 includes a small display screen 104 (hereinafter "screen"), a projector 102 and a camera 103. In some embodiments, the device 101 includes more than one projector 102 and more than one camera 103. The projector 102 is capable of projecting a light on a region located within a blank surface. The virtual canvas 105 is the region within the blank surface on which the projection is made by the projector 102. Stated differently, the virtual canvas 105 is the region within the blank surface illuminated by the projector 102. A capture window (not shown) of the camera 103 will later capture this region of the blank surface, as explained in detail below. The blank surface in which the projection is made includes, for example, a two-dimensional surface or area such as a blank wall, whiteboard or curtain. Typically, in embodiments in which the virtual canvas includes a two-dimensional projection area or surface, only one projector 102 and one camera 103 are used.

According to an embodiment, the camera 103 may focus on the virtual canvas 105 to capture, in a video format, the movements of a user-operated object on the virtual canvas 105. Then, the device 101 processes the captured video to obtain information input by the object and stores the input information into the device storage (not shown). Alternatively, the input information may be projected on the virtual canvas 105 so that a user can review the information input on the virtual canvas 105. This may allow the user, for example, to detect and correct information input erroneously. The user is allowed to make any necessary changes to the input information projected on the virtual canvas 105.

In some embodiments, a user may use any user-operated (input) object including a finger 106 or a laser pen (not shown) to write or draw on the virtual canvas 105. In the case of using the finger 106, the camera 103, which is focused on the virtual canvas 105, captures movements of the user's finger 106 and converts them into frame-series images (hereinafter referred to as "frames") of a video. The device 101 may then process the frames and identify the input information 107 as points, path lines, text, or drawings. It should be noted that information input by a finger or a laser pen has no trajectory on the virtual canvas. Stated differently, the user may write or draw on the virtual canvas but cannot see the information input. As mentioned above, by projecting the input information 107 on the virtual canvas after being processed by the device 101, the user is capable of reviewing the input information and making any necessary changes. As such, the virtual canvas 105 becomes an extra input interface area or input space of the device 101. In some embodiments, the device 101 may display the input information 107 on the screen 104. In this example, the input information includes two-dimensional information.

Figure 3:
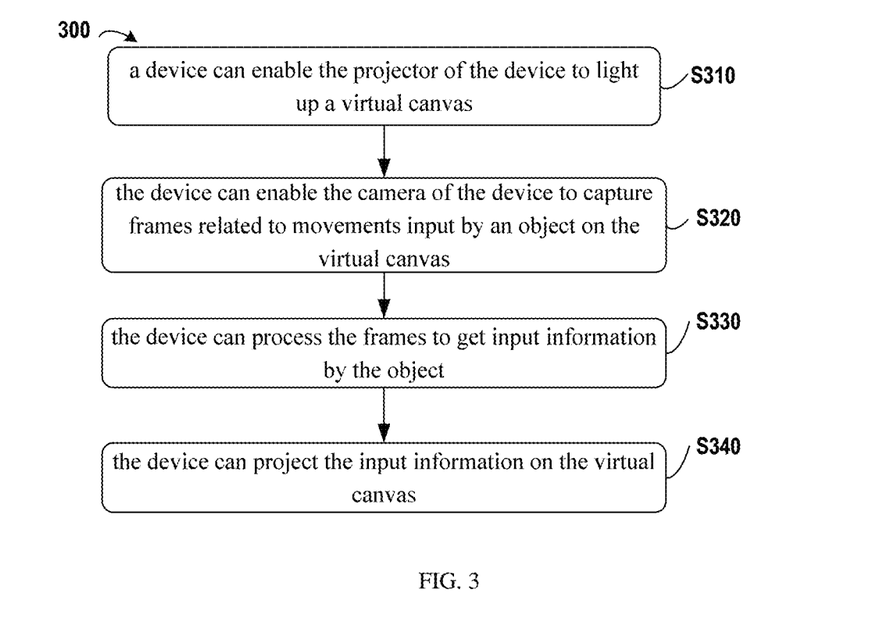
FIG. 3 is a flowchart for inputting information using a virtual canvas, according to an embodiment of the present invention.

Referring now to FIG. 3, a flowchart for inputting information to a device (e.g. device 101) using a virtual canvas (e.g. virtual canvas 105) is shown, according to an embodiment of the present invention. The process begins when the device receives a request for inputting information using a virtual canvas. In response to the request, at step S310, the device enables a projector on the device to display a virtual canvas. At this step the projector is powered on illuminating a region on a blank surface. As described above, this region is the virtual canvas.

Once an input object (for example the finger 106 or a laser pen) is used to input information on the virtual canvas 105 (FIG. 2), the device enables a camera of the device to capture frames corresponding to the movements made on the virtual canvas at step S320.

It should be noted that because the information inputting process is a continuous process, in some embodiments the camera records a video to capture the movement of an object on the virtual canvas, and only part of the input information is recorded in frames of the video. Some frames may include a piece of input information. Once the device has obtained enough frames related to a piece of input information, it processes the frames to get the piece of information input by the object at step S330. Then, according to some embodiments, the device enables the projector of the device to project the piece of input information on the virtual canvas at step S340. Thus, the user may see what he/she has input from the virtual canvas.

In some embodiments, the process 300 may be executed by a stand-alone application on the device 101 (FIG. 2), such as a picture drawing application. In some embodiments, the process 300 may be executed by a plug-in of an application on the device 101, such as a plug-in of a text editor or a plug-in of a picture drawing tool, etc. In some embodiments, the process may be executed by a server or a PC which may be connected to the device by any communication protocol to remotely control the device 101 (FIG. 1). The communication protocols may include but are not limited to Bluetooth, WIFI, 3G, 4G, etc.

In some embodiments, when the device enables the projector in response to a request to input information using a virtual canvas, the projector first lights up the virtual canvas and then detects the distance between the device and the virtual canvas using a distance sensor on the device, such as an infrared distance measurement sensor, and automatically focuses the camera on the 2D surface on which the virtual canvas is displayed. As such, the input information can be clearly projected on the virtual canvas after being processed. Once the virtual canvas is generated and the camera is enabled to capture all or substantially all of the virtual canvas within its capture window, the camera automatically focuses on the virtual canvas to capture images or videos. Well known technologies, such as auto-focus technology, may be used by both the projector and the camera.

In some embodiments, the projector can be manually adjusted to focus on the virtual canvas. Once the virtual canvas is generated and the camera is enabled, the camera can also be manually adjusted to focus on the virtual canvas to capture images or videos. In some embodiments, the camera may be enabled by pressing the laser pen, which may communicate with the device via a wired/wireless connection. In some embodiments, the device may enable the camera automatically after enabling the projector.

In some embodiments, the capture window of the camera is equal, or substantially equal, to a size of the area of the virtual canvas. Alternatively, according to other embodiments, the capture window of the camera is larger than the area of the virtual canvas. Although it is conceivable that the capture window of the camera could be smaller than the area of the virtual canvas, it would be less effective as there would be an increased risk of information appearing at or near the perimeter of the virtual canvas not being captured by the camera and thus not input into the device. In some embodiments, once the projector and the camera are enabled, they may stay active for a designated period of time, or until no information is detected on the virtual canvas. In some embodiments, once both the projector and the camera are enabled, they may be kept active or inactive according to user's requirements (e.g., to save power).

According to an embodiment, it may be assumed that the virtual canvas is captured in its entirety by the capture window of the camera, in such a case, a view on the virtual canvas can be captured by an image in the frames of the video. Then, a location on the two-dimensional virtual canvas can be mapped to a pixel location on the image from the video of the device on a projected scale. A specific point on an original virtual canvas is selected as a reference point, whose coordinates may be set as specific values, for example, the center point of the original virtual canvas may be selected as the reference point, and its coordinates may be set as (0,0). It may be understood that other points in the original virtual canvas may be selected as the reference point, including, for example, a point on the lower-left corner of the original virtual canvas, or a point in the upper-right corner of the original virtual canvas. Alternatively, according to another embodiment, a user may define the coordinates of the reference point (user-defined coordinates).

In some embodiments, the coordinates of a point on the original virtual canvas can be mapped to the location of the pixel on the image in the device. For example, when the size of the image is 800*1600 pixels, if the center point of the original virtual canvas is selected as the reference point, its coordinates are (0,0), then the coordinates of the lower-left corner of the original virtual canvas are (−400, −800), and the coordinates of the point in the upper-right corner of the original virtual canvas are (400, 800).

In some embodiments, the size of the virtual canvas may be in proportion to the pixel size of the image. For example, when the size of the image is 800*1600 pixels, the proportion is 2. And, if the center (0,0) of the original virtual canvas is selected as the reference point, the coordinates of the lower-left corner of the original virtual canvas are (−200, −400), and the coordinates of the point in the upper-right corner of the original virtual canvas are (200, 400). Those skilled in the art may understand that the size of the virtual canvas may be defined based on user's preferences, for example 1000*800, 500*400, etc.

After the input information, including points or lines drawn on the virtual canvas, is captured, a location of the input information on the virtual canvas is determined based on the location of the reference point (coordinate: (0, 0)) and the proportion.

In this way, the coordinates of the input information can be determined and expressed relative to the reference point. In embodiments in which the input information includes points, the coordinates of the input information are the coordinates of the input points.

In some embodiments, in response to the input information being captured by the camera, the device may determine the coordinates of the input information relative to a predefined reference point and may store the coordinates of the input information. The coordinates of the input information may be stored in the form of a file, or a database. In some embodiments, the location of the reference point and its coordinates may be saved on the device storage.

Figure 4:
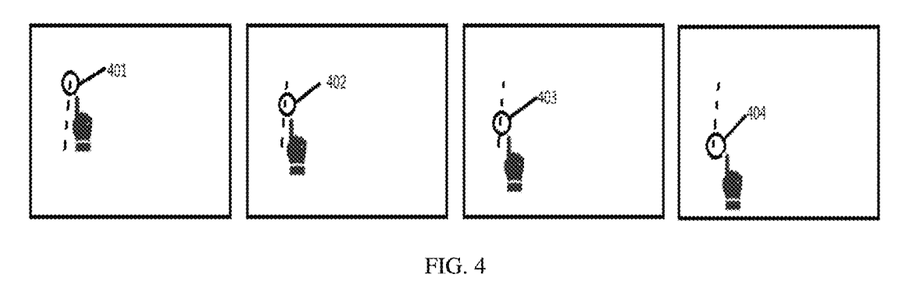
FIG. 4 shows a plurality of frames indicating information input by an input object on a two-dimensional virtual canvas, according to an embodiment of the present invention.

In some embodiments, if the user uses his/her hand or pen to input information via the virtual canvas, then the action may be captured by the camera using video mode, and frames of the video may be input into the device. For example, FIG. 4 shows a plurality of frames indicating information input on a two-dimensional virtual canvas by an input object. The device receives the input information. Using existing video/image processing technology, points 401, 402, 403 and 404 input by the finger, which include a track of the finger, are recognized by the device from the first, second, third and fourth frame, respectively. These four points may include part of the input information. It may be understood that the four frames are just an example, and that there may be a plurality of frames which may be obtained and a plurality of points that may be recognized. Then, the device may store the coordinates of these points into the storage as input information.

In some embodiments, several frames may be used to determine input speed. When the input speed changes, a related input is ended while another related input is started. The related input may be a continuous diagram, such as a circle, a line segment, or a stroke. In an example of the two-dimensional virtual canvas, the first several points in the first several frames may be recognized, and the coordinates and input time of these points may also be determined, and then the input speed between point A and point B may be calculated using the following formula:

$$s = \frac{\sqrt{(X_A - X_B)^2 + (Y_A - Y_B)^2}}{|T_A - T_B|}$$

where the coordinate of point A is $(X_A, Y_A)$, being input at time $T_A$, and the coordinate of point B is $(X_B, Y_B)$ being input at time $T_B$. Then, the average input speed of the first several points may be determined using the input speed of each two consecutive points in the first several points, and the average input speed may be set as the threshold of the input speed.

In some embodiments, if the input speed of two recognized adjacent points is a specific percentage (such as 20%) larger than the threshold of the input speed in a related input, the start point of the two adjacent points may be recognized as an end point of a related input. After an end point of a related input or an input switching point is obtained, if the input speed of two adjacent points recognized is a specific range (such as 20%) larger than the threshold of the input speed, the start point of the two adjacent points may be recognized as an input switching point as will be explained in detail below.

Figure 5:
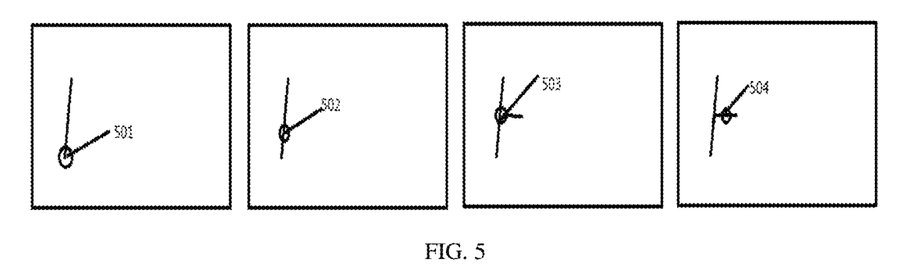
FIG. 5 shows a plurality of frames indicating information from one related input (a vertical line) to another (a vertical line) being input on a two-dimensional virtual canvas using an input object, according to an embodiment of the present invention.

Referring now to FIG. 5, a plurality of frames indicating information from one related input (a vertical line) to another (a horizontal line) is shown, according to an embodiment of the present disclosure. The plurality of frames is input on a two-dimensional virtual canvas by an (user-operated) input object. In this embodiment, lower and upper thresholds are defined for the input speed. Based on the defined thresholds a point can be determined as the end point of the related input. For example, an input speed lower threshold is set to 10 while an input speed upper threshold is set to 12, if the input speed between point 500 (not shown) and 501 is 11 (e.g. above the input speed lower threshold but below the input speed upper threshold) and the input speed between point 501 and 502 is 13 (e.g. above the input speed upper threshold), then the point 501 is determined as the end point of the related input (vertical line). If the input speed between points 502 and 503 is 13 (above the input speed upper threshold) and, since the end point of the related input 501 has just been obtained, the point 502 is recognized as the input switching point between two related inputs. The input switching point is not the real input and there is no need to store it. Finally, if the input speed between points 503 and 504 is 11, which is within the determined input speed thresholds, the point 503 is recognized as a start point of another related input.

In some embodiments, the related input may be a track input by the input object. For example, if the input object is a laser pen, when the laser pen is powered on, its track may be captured on a video by the camera as part of a related input, and when the laser pen is powered off, the related input is ended, the related input may be a piece of the input information. If the input object is a finger, when the finger begins to draw on the virtual canvas, its track may be captured on a video by the camera as part of a related input, when the hand including the finger makes a fist, the related input is ended, the related input may be a piece of the input information. The track (e.g. a piece of the input information) may include a plurality of points from a plurality of frames of the video, and the coordinate of these plurality of points relative to the reference point on the virtual canvas may be determined using the above method and may be saved to the device storage.

In some embodiments, the user may enable the device to recognize a related input as a continuous diagram, such as a circle, a line segment or a stroke. In other embodiments, a user may enable the device to recognize a plurality of related input as text.

By using the above method, the input information on the virtual canvas may be recognized as a plurality of points, line segments, diagrams, or text. As such, the method may be executed by a stand-alone application on the device, such as a figure drawing application, or a plug-in of an application on the device, such as a plug-in of text editor or drawing tool.

In some embodiments, the input time of a point from each frame may be stored into the coordinates of the input information in the storage of the device, so that the process of information input may be played back, which may be used for educational purposes. In some embodiments, the input time of the point may be the real time of the point being input (e.g. 13:50:00 on April 25). In some embodiments, the input time of the point may be a time difference between the input time of the point and the input time of the first point input in the original virtual canvas. For example, the real time of the first point being input is 13:50:00 on April 25, and the real time of the current point being input is 13:50:20 on April 25, then the input time stored for the first point is 0 and the input time stored for the current point is 20.

Figure 6:
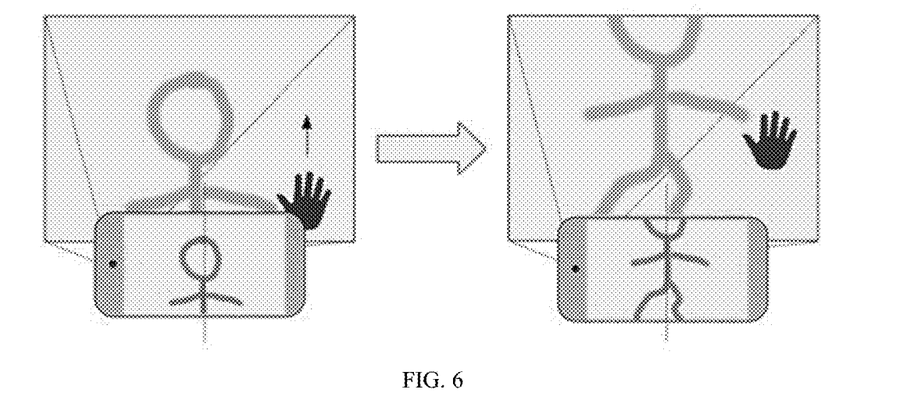
FIG. 6 shows an example of a gesture captured by the camera of the device for expanding upwards an input space on the virtual canvas, according to an embodiment of the present invention.

In some embodiments, the user may use his/her hand or any other input object to make a gesture in a capture area of the camera, the gesture may be captured by the camera in video mode and may be recognized by the device using existing technology. The gesture may be mapped to an action taken by the device. Once the device recognizes the gesture, the device may take the action indicated by the gesture. For example, FIG. 6 shows an example of a gesture captured by the camera for expanding the input space downward. The gesture, such as a palm moving upward in the camera capture area, is captured by the camera into the device using video mode, the device may recognize the gesture using existing video and image processing technologies, and also may determine that the gesture indicates that the input space need to be expanded downward. In one implementation, the device then makes the projector rotate a specific angle, such that the virtual canvas can be expanded downward, e.g. the location of the virtual canvas on the blank surface can be changed. As shown in FIG. 6, after the device executes the action, the input information displayed on the virtual canvas can be moved accordingly. As shown in the figure, some parts of the drawing have moved out of the first view of the virtual canvas and more space moved into the current view of the virtual canvas from the bottom, as such the drawing may be continued and completed in the new space. According to other embodiments, the device may make the projected input information move downward, e.g. the location of the virtual canvas on the blank surface cannot be changed, but the projected input information moves upward. The technical effect is similar to the one shown in FIG. 6. In this way, the input space may be expanded in different direction, such as left, right, up, or down, etc.

In some embodiments, if the new information is input on the virtual canvas, the coordinates of the new information relative to the reference point may be determined based on a length of the virtual canvas/input information and stored into the coordinates of information.

In some embodiments, the focus length of the projector can be changed by the device so that the size of both the virtual canvas and the input information can be changed, e.g. either enlarged or reduced.

In some embodiments, a gesture may also indicate that the input information projected on the virtual canvas needs to be enlarged or reduced while the location and size of the virtual canvas remains the same. For example, the projected input information may be reduced when the user makes a fist, or the projected input information is enlarged when the user opens his hand or extends his fingers. It may be understood that any other gesture may be used in this invention to enlarge or reduce the projected input information. If the projected input information is being enlarged, then the new information is input, the coordinates of the new information relative to the reference point may be determined based on the enlarging scale, and may be stored into the coordinates of information.

It may be understood that gesture recognition in a video may be implemented by any other existing algorithms, such as three-dimensional model-based algorithms, skeletal-based algorithms, and appearance-based models, etc.

In some embodiments, a gesture may be made by the user on the display screen of the device to indicate that the virtual canvas is being expanded in a specific direction or that the projected input information is being enlarged or reduced. It should be noted that any suitable technology may be used to recognize the gesture performed by the user. For example, the gesture may include sliding the fingers on a touch screen to expand the display screen to the left as shown in FIG. 7.

Figure 7:
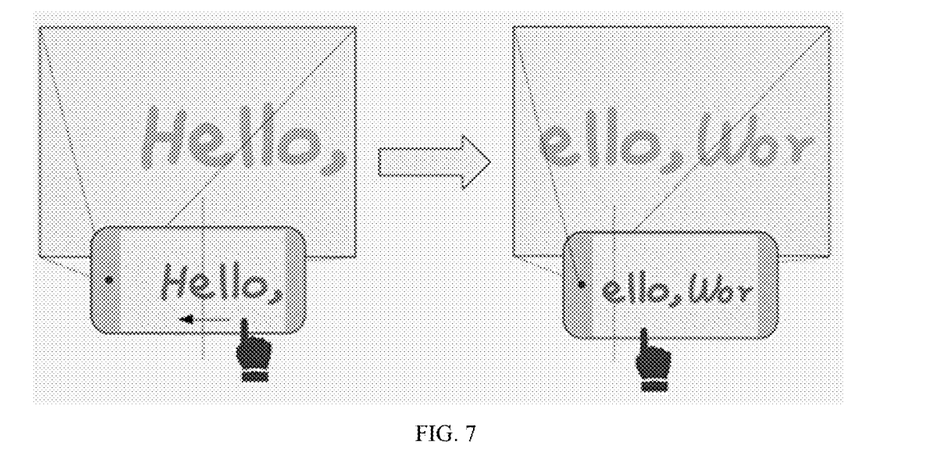
FIG. 7 shows a gesture of sliding a finger on a touchable screen for expanding the input space to the left, according to an embodiment of the present invention.

Referring now to FIG. 7, the gesture of sliding the finger on a touchable screen for expanding the input space to the right is shown, according to an embodiment of the present invention. Similar to the implementations in FIG. 6, either the projector can rotate a specific angle, or the projected input information can be moved to the left. In FIG. 7, the text "Hello," is written in a first view of the virtual canvas, then the finger slides on the touch display screen from right to left. As can be appreciated in the figure, the content displayed in the first view of the virtual canvas moved to the left. It should be noted that the gesture may be performed in different directions on the touchable display screen in order to expand the input space left, right, up or down, or any other directions. It may be understood that the gesture may be performed to enlarge or reduce the projected input information.

In some embodiments, the input space may be expanded by an action of moving the device by the user. When the device is moved, the camera may detect the background movement. In response to the detected background movement, the device may expand the input space in a direction similar to the direction of the background movement as will be explained in FIG. 8.

Figure 8:
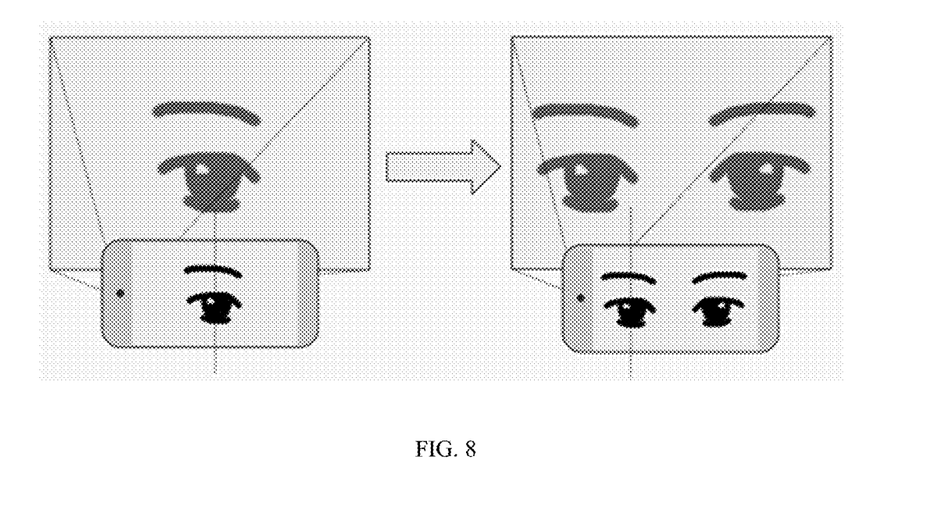
FIG. 8 shows an action of moving the device for expanding the input space to the right, according to an embodiment of the present invention.

Referring now to FIG. 8, an action of moving the device for expanding the input space to the right is shown, according to an embodiment of the present disclosure. A first view of the virtual canvas includes an incomplete image showing only one eye, in this embodiment, the input space may be expanded to the right to get more space by moving the device to the right. As may be appreciated, after moving the device, the complete image showing two eyes is displayed. It may be understood that the device may be moved in different directions in order to expand the input space left, right, up or down.

In some embodiments, the input space may be expanded by rotating the device by the user. When the device is rotated, sensors in the mobile device may detect an attitude angle change. In response to detecting the attitude angle change, the virtual canvas may be expanded in a requested direction as explained in FIG. 9.

Figure 9:
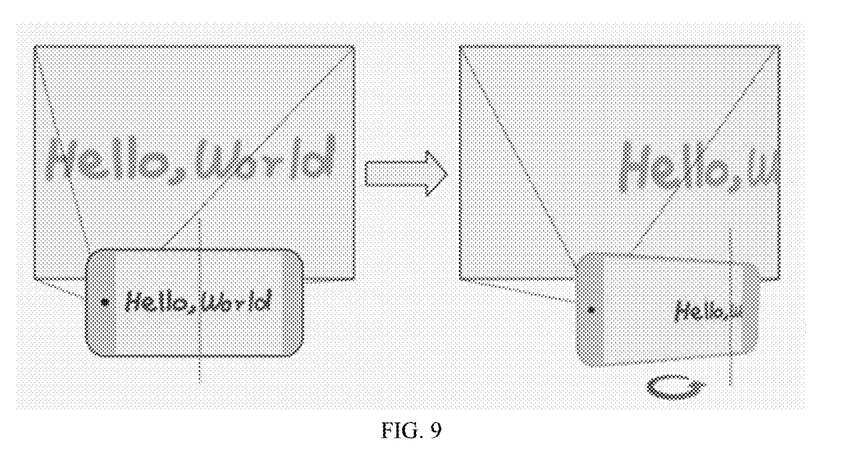
FIG. 9 shows an action of rotating the device for expanding the input space to the right, according to an embodiment of the present invention.

Referring now to FIG. 9, an action of rotating the device for expanding the input space to the left is shown, according to an embodiment of the present invention. The text "Hello, World" has already been written in the center of a first view of the virtual canvas. When the device is rotated, the projector can also be rotated, so the location of the virtual canvas lit by the projector can be changed. The device can make the projected input information move accordingly. As can be appreciated in the figure, parts of the projected text have been moved outside of the first view while creating more blank space in a second view of the virtual canvas. In such way, the input space can be expanded in different directions, such as left, right, up or down.

After scaling the projected input information (e.g., enlarged or reduced), since the size of the virtual canvas do not change while the size of the input information projected on the virtual canvas is reduced, a new area is defined which may be used to input new information. When the movements of the input object are captured by the camera, the coordinates of the new input information may be stored in the device storage. In some embodiments, the new input information and original input information may be stored in the same file or database until the input process ends.

In some embodiments, if the device is requested to access stored coordinates of the input information, the device may project on the virtual canvas based on the stored coordinates of the input information. When the input space is expanded to a new area, the device may project the input information on the new area. In such scenario, if a piece of new information is input on the virtual canvas, the device may project the piece of new information on the virtual canvas and store the piece of new information into the stored coordinates of information. If a piece of existing information on the virtual canvas is being deleted, the device may not project the piece of existing information from the virtual canvas and may delete the piece of existing information from the stored coordinates of information; if another piece of existing information on the virtual canvas is being modified, the device may project the modified piece of existing information on the virtual canvas and may modify the piece of existing information in the stored coordinates of information.

In some embodiments, actions such as expanding the input space, enlarging the projected input information, etc. and the time of each action can be stored in the device storage, this may allow playing back the input process for educational purposes.

Therefore, by using a camera on a mobile device to capture and record the movement of a finger or laser pen, a path line can be displayed on the virtual canvas as well as on the screen of the mobile device. The initial display area includes an original size of the virtual canvas with an initial screen center being located at the origin of the coordinate system. The described embodiments may, among other potential benefits, provide a set of ways to expand an input space and scale the input information projected on the virtual canvas. As such, users can write or draw using the virtual canvas which provides a considerably larger input area than the display screen. Additionally, by projecting the input information on the virtual canvas after being processed, the user is presented with a summary and/or detail review of the input information and may be allowed to modify the input information as needed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a device equipped with a projector and a camera, a request to input information through a virtual canvas, the virtual canvas providing an input space to a user of the device, wherein the virtual canvas comprises a region of a blank surface illuminated by the projector and a size of the virtual canvas is captured entirely by a capture window of the camera;
based on the received request, enabling, by the device, the projector and the camera;
detecting, by the device, a distance between the device and the virtual canvas;
based on the detected distance, adjusting, by the device, the projector and the camera to focus on the virtual canvas;
capturing, by the device using the camera, a video of a movement made by an object on the virtual canvas, wherein the object is operated by a user of the device, and the movement provides the input information to the device for the received request;
converting, by the device, the captured video into a plurality of image frames, wherein each image in the plurality of image frames comprises at least two points associated with the movement;
selecting, by the device, a point on the virtual canvas as a reference point, the reference point comprising user-defined coordinates;
based on the reference point, determining, by the device using image processing techniques, coordinates for each of the at least two points associated with the movement for each image in the plurality of image frames;
based on the determined coordinates and an input time associated with the determined coordinates, calculating, by the device, an input speed for the at least two points in each image of the plurality of image frames;
based on the calculated input speed, calculating, by the device, an average input speed using the input speed of two consecutive points in the at least two points associated with the movement;
based on the calculated average input speed, calculating, by the device, a lower input speed threshold corresponding to a predefined lower percentage of the average input speed and an upper input speed threshold corresponding to a predefined higher percentage of the average input speed for identifying end points of the movement;
based on the lower and upper input speed thresholds, recognizing, by the device, the movement as at least one of a point, a line segment, a geometric figure, a diagram, and a text;
projecting, by the device, on the virtual canvas the recognized movement on a location selected according to the determined coordinates and the reference point;
storing, by the device, the recognized movement as being associated with the input information together with the input time, wherein storing the recognized movement as being associated with the input information together with the input time allows playing back the input information on the virtual canvas;
expanding, by the device, the input space in a direction indicated by an action performed by the user; and scaling, by the device, the input information according to the expanded input space.

2. The method according to claim 1, further comprising:
receiving the action indicating the input space being expanded in the direction; and
based on the received action, adjusting a focus of the projector to make a projection in the direction indicated by the action.

3. The method according to claim 2, wherein the received action comprises:
a gesture captured by the camera of the device;
a gesture made on the screen of the device;
moving the device; or
rotating the device.

4. The method according to claim 1, further comprising:
receiving the action indicating the input space being expanded in the direction; and
based on the received action, adjusting the input information in a direction opposite to the direction indicated by the action.

5. The method according to claim 1, further comprising:
storing the coordinates for the location of the input information on a storage of the device.

6. The method according to claim 5, further comprising:
in response to the stored coordinates of the input information being accessed, projecting on the virtual canvas.

7. The method according to claim 5, further comprising:
receiving new input information on the virtual canvas;
based on the received new input information, storing coordinates of the new input information; and
making a projection on the virtual canvas based on the coordinates of the new input information.

8. The method according to claim 5, further comprising:
modifying the input information;
based on modifying the input information, updating the stored coordinates of input information; and
making a projection on the virtual canvas based on the updated stored coordinates of the input information.

9. A computing system comprising a computer processor coupled to a computer-readable memory unit, said memory unit comprising instructions that when executed by the computer processor implements a method comprising:
receiving, by a device equipped with a projector and a camera, a request to input information through a virtual canvas, the virtual canvas providing an input space to a user of the device, wherein the virtual canvas comprises a region of a blank surface illuminated by the projector and a size of the virtual canvas is captured entirely by a capture window of the camera;
based on the received request, enabling, by the device, the projector and the camera;
detecting, by the device, a distance between the device and the virtual canvas;
based on the detected distance, adjusting, by the device, the projector and the camera to focus on the virtual canvas;
capturing, by the device using the camera, a video of a movement made by an object on the virtual canvas, wherein the object is operated by a user of the device, and the movement provides the input information to the device for the received request;
converting, by the device, the captured video into a plurality of image frames, wherein each image in the plurality of image frames comprises at least two points associated with the movement;
selecting, by the device, a point on the virtual canvas as a reference point, the reference point comprising user-defined coordinates;
based on the reference point, determining, by the device using image processing techniques, coordinates for each of the at least two points associated with the movement for each image in the plurality of image frames;
based on the determined coordinates and an input time associated with the determined coordinates, calculating, by the device, an input speed for the at least two points in each image of the plurality of image frames;
based on the calculated input speed, calculating, by the device, an average input speed using the input speed of two consecutive points in the at least two points associated with the movement;
based on the calculated average input speed, calculating, by the device, a lower input speed threshold corresponding to a predefined lower percentage of the average input speed and an upper input speed threshold corresponding to a predefined higher percentage of the average input speed for identifying end points of the movement;
based on the lower and upper input speed thresholds, recognizing, by the device, the movement as at least one of a point, a line segment, a geometric figure, a diagram, and a text;
projecting, by the device, on the virtual canvas the recognized movement on a location selected according to the determined coordinates and the reference point;
storing, by the device, the recognized movement as being associated with the input information together with the input time, wherein storing the recognized movement as being associated with the input information together with the input time allows playing back the input information on the virtual canvas;
expanding, by the device, the input space in a direction indicated by an action performed by the user; and
scaling, by the device, the input information according to the expanded input space.

10. The computing system according to claim 9, further comprising:
receiving the action indicating the input space being expanded in the direction; and
based on the received action, adjusting a focus of the projector to make a projection in the direction indicated by the action.

11. The computing system according to claim 10, wherein the received action comprises:
a gesture captured by the camera of the device;
a gesture made on the screen of the device;
moving the device; or
rotating the device.

12. The computing system according to claim 9, further comprising:
storing the coordinates for the location of the input information on a storage of the device.

13. The computing system according to claim 12, further comprising:
based on the stored coordinates of the input information, projecting on the virtual canvas.

14. The computing system according to claim 12, further comprising:
receiving new input information on the virtual canvas;
based on the received new input information, storing coordinates of the new input information and deleting the stored coordinates of input information; and making a projection on the virtual canvas based on the coordinates of the new input information.

15. The computing system according to claim 12, further comprising:
   modifying the input information;
   based on modifying the input information, updating the stored coordinates of input information; and
   making a projection on the virtual canvas based on the updated stored coordinates of the input information.

16. A computer program product, the computer program product comprising a computer readable non-transitory article of manufacture tangibly embodying computer readable instructions which, when executed, cause a computer to carry out a method comprising:
   receiving, by a device equipped with a projector and a camera, a request to input information through a virtual canvas, the virtual canvas providing an input space to a user of the device, wherein the virtual canvas comprises a region of a blank surface illuminated by the projector and a size of the virtual canvas is captured entirely by a capture window of the camera;
   based on the received request, enabling, by the device, the projector and the camera;
   detecting, by the device, a distance between the device and the virtual canvas;
   based on the detected distance, adjusting, by the device, the projector and the camera to focus on the virtual canvas;
   capturing, by the device using the camera, a video of a movement made by an object on the virtual canvas, wherein the object is operated by a user of the device, and the movement provides the input information to the device for the received request;
   converting, by the device, the captured video into a plurality of image frames, wherein each image in the plurality of image frames comprises at least two points associated with the movement;
   selecting, by the device, a point on the virtual canvas as a reference point, the reference point comprising user-defined coordinates;
   based on the reference point, determining, by the device using image processing techniques, coordinates for each of the at least two points associated with the movement for each image in the plurality of image frames;
   based on the determined coordinates and an input time associated with the determined coordinates, calculating, by the device, an input speed for the at least two points in each image of the plurality of image frames;
   based on the calculated input speed, calculating, by the device, an average input speed using the input speed of two consecutive points in the at least two points associated with the movement;
   based on the calculated average input speed, calculating, by the device, a lower input speed threshold corresponding to a predefined lower percentage of the average input speed and an upper input speed threshold corresponding to a predefined higher percentage of the average input speed for identifying end points of the movement;
   based on the lower and upper input speed thresholds, recognizing, by the device, the movement as at least one of a point, a line segment, a geometric figure, a diagram, and a text;
   projecting, by the device, on the virtual canvas the recognized movement on a location selected according to the determined coordinates and the reference point;
   storing, by the device, the recognized movement as being associated with the input information together with the input time, wherein storing the recognized movement as being associated with the input information together with the input time allows playing back the input information on the virtual canvas;
   expanding, by the device, the input space in a direction indicated by an action performed by the user; and
   scaling, by the device, the input information according to the expanded input space.

17. The computer program product according to claim 16, further comprising:
   receiving the action indicating the input space being expanded in the direction; and
   based on the received action, adjusting a focus of the projector to make a projection in the direction indicated by the action.

18. The computer program product according to claim 17, wherein the received action comprises:
   a gesture captured by the camera of the device;
   a gesture made on the screen of the device;
   moving the device; or
   rotating the device.

19. The computer program product according to claim 16, further comprising:
   storing the coordinates for the location of the input information on a storage of the device.

20. The computer program product according to claim 19, further comprising:
   based on the stored coordinates of the input information, projecting on the virtual canvas.

* * * * *